US009827832B2

(12) United States Patent
Ferreira et al.

(10) Patent No.: US 9,827,832 B2
(45) Date of Patent: Nov. 28, 2017

(54) RETROFIT DEBRIS SHIELD FOR VEHICLE AIR CONDITIONING SYSTEMS

(71) Applicant: AirSept, Inc., Atlanta, GA (US)

(72) Inventors: Ivo Ferreira, Atlanta, GA (US); Aaron Becker, Atlanta, GA (US)

(73) Assignee: AirSept, Inc., Atlanta, GA (US)

( * ) Notice: Subject to any disclaimer, the term of this patent is extended or adjusted under 35 U.S.C. 154(b) by 0 days.

(21) Appl. No.: 14/832,471

(22) Filed: Aug. 21, 2015

(65) Prior Publication Data

US 2016/0052372 A1    Feb. 25, 2016

Related U.S. Application Data

(60) Provisional application No. 62/040,267, filed on Aug. 21, 2014.

(51) Int. Cl.
*B60H 3/06* (2006.01)
*B01D 46/00* (2006.01)

(52) U.S. Cl.
CPC ....... *B60H 3/0616* (2013.01); *B01D 46/0016* (2013.01); *B60H 2003/065* (2013.01)

(58) Field of Classification Search
CPC ........ B01D 46/00; B01D 46/10; B01D 46/52; B01D 46/521
USPC ............ 55/385.1, 385.3, 482, 493, 497, 502
See application file for complete search history.

(56) References Cited

U.S. PATENT DOCUMENTS

| | | | |
|---|---|---|---|
| 5,679,122 A | 10/1997 | Moll et al. | |
| 6,164,457 A | 12/2000 | Schlor | |
| 6,860,916 B2 | 3/2005 | Kubokawa et al. | |
| 2002/0069624 A1* | 6/2002 | Jaramillo | B01D 46/10 55/385.3 |
| 2006/0059873 A1* | 3/2006 | Scully | A01G 1/125 55/385.1 |
| 2009/0151307 A1* | 6/2009 | Zbiral | F02M 35/02 55/315 |
| 2010/0043366 A1 | 2/2010 | Boehrs et al. | |
| 2010/0147381 A1 | 6/2010 | Haney et al. | |
| 2012/0211293 A1* | 8/2012 | Leanza | B60K 13/02 180/68.3 |
| 2014/0150384 A1* | 6/2014 | Bunnell | F02M 35/088 55/332 |
| 2014/0345238 A1* | 11/2014 | Jun | H05K 7/20718 55/385.4 |
| 2015/0260427 A1* | 9/2015 | Snyder | F24F 13/085 454/289 |

* cited by examiner

*Primary Examiner* — Duane Smith
*Assistant Examiner* — Minh-Chau Pham
(74) *Attorney, Agent, or Firm* — Womble Carlyle Sandridge & Rice LLP

(57) ABSTRACT

A debris shield is disclosed for preventing debris from being sucked into the recirculate inlet of certain trucks used in the rental truck industry and thereby clogging the air conditioning evaporator coils and other components of the air conditioning system. The shield includes a segmented frame configured to fit over an opening of the system in such a way that any debris sucked into the recirculate inlet within the cab encounters and is arrested by the shield before reaching sensitive components. A method of shielding an automotive air conditioning system from entrained debris also is disclosed.

22 Claims, 5 Drawing Sheets

RETROFIT DEBRIS SHIELD FOR VEHICLE AIR CONDITIONING SYSTEMS

REFERENCE TO RELATED APPLICATION

Priority is hereby claimed to the filing date of U.S. provisional patent application 62/040,267 filed on Aug. 21, 2014, the entire content of which is hereby incorporated by reference.

TECHNICAL FIELD

This disclosure relates generally to automotive air conditioning and air handling systems and more particularly to air conditioning and air handling systems of medium and heavy duty work trucks such as those used in the truck rental industry.

BACKGROUND

Thousands of medium and heavy duty work trucks are rented to individuals each year by companies such as U-Haul® and others. These trucks are used by renters for short and long haul moving, local hauling, and other purposes. One common truck model used by these companies is the Ford® E Series® truck, platform, to which various trailer configurations may be mounted.

Truck rental companies have for some time endured a problem with the air conditioning and air handling systems (hereinafter referred to simply as the air conditioning system or AC system) of their truck cabs. More specifically, the interior it air inlets of these systems, which draw in air in the recirculate mode of the system, are located near the floorboard of the cab. When individuals use trucks they have rented for moving, they tend to drop a significant amount of debris into the floorboard. This debris can include, for example, food, paper, hair from pets carried in the cab, dust, and other items. Such debris tends to be drawn into the recirculate inlet near the floorboard of the cab and become stuck on the AC evaporator coil and other components within the system. As a result, the evaporator coil and other components relatively quickly begin to clog with debris. FIG. 1 illustrates the appearance of an actual evaporator coil from a Ford® E Series® rental truck cab after having become clogged with debris. This clogging, in turn, significantly shortens the life cycle of air conditioning coils and components, which must be replaced a more frequent basis. Replacement of evaporator coils in its rental trucks is an expensive and unwanted repair for truck rental companies.

A need therefore exists for an apparatus and method for preventing debris from entering the air conditioning systems of rental trucks and other medium and heavy duty trucks. It is to the provision of such a method and apparatus that the present invention is primarily directed.

SUMMARY

Briefly described, the invention disclosed in exemplary embodiments herein is a retro-fit debris shield for air conditioning systems of certain truck cabs. The debris shield, when installed, prevents debris from entering the air conditioning systems from the interior of the cab, particularly when the air conditioning systems are operating, in recirculate mode. The debris shield comprises a frame that is segmented and configured to fit over an air inlet opening of the air conditioning system upstream of the evaporator coil and other sensitive components. In one embodiment, an air permeable mesh material spans and is supported by the frame and has a mesh size sufficiently small to prevent airborne debris such as pet hair and dust from passing through the mesh. A truck rental company, as part of routine maintenance, need only remove a plastic kick plate within the cab, insert the debris shield into its designated location, and reinstall the kick plate. Thereafter, debris is arrested by the debris shield and does not pass downstream to the evaporator coil and other components of the system, which consequently do not become prematurely clogged. Replacing the debris shield on a regular maintenance schedule is easy inexpensive, and significantly increases the life cycles of downstream components of the air conditioning system.

These and other features, aspects, and advantages of the debris shield and method will become more apparent upon review of the detailed description set forth below taken in conjunction with the accompanying drawing figures which are briefly described as follows.

DETAILED DESCRIPTION

Figure 1:
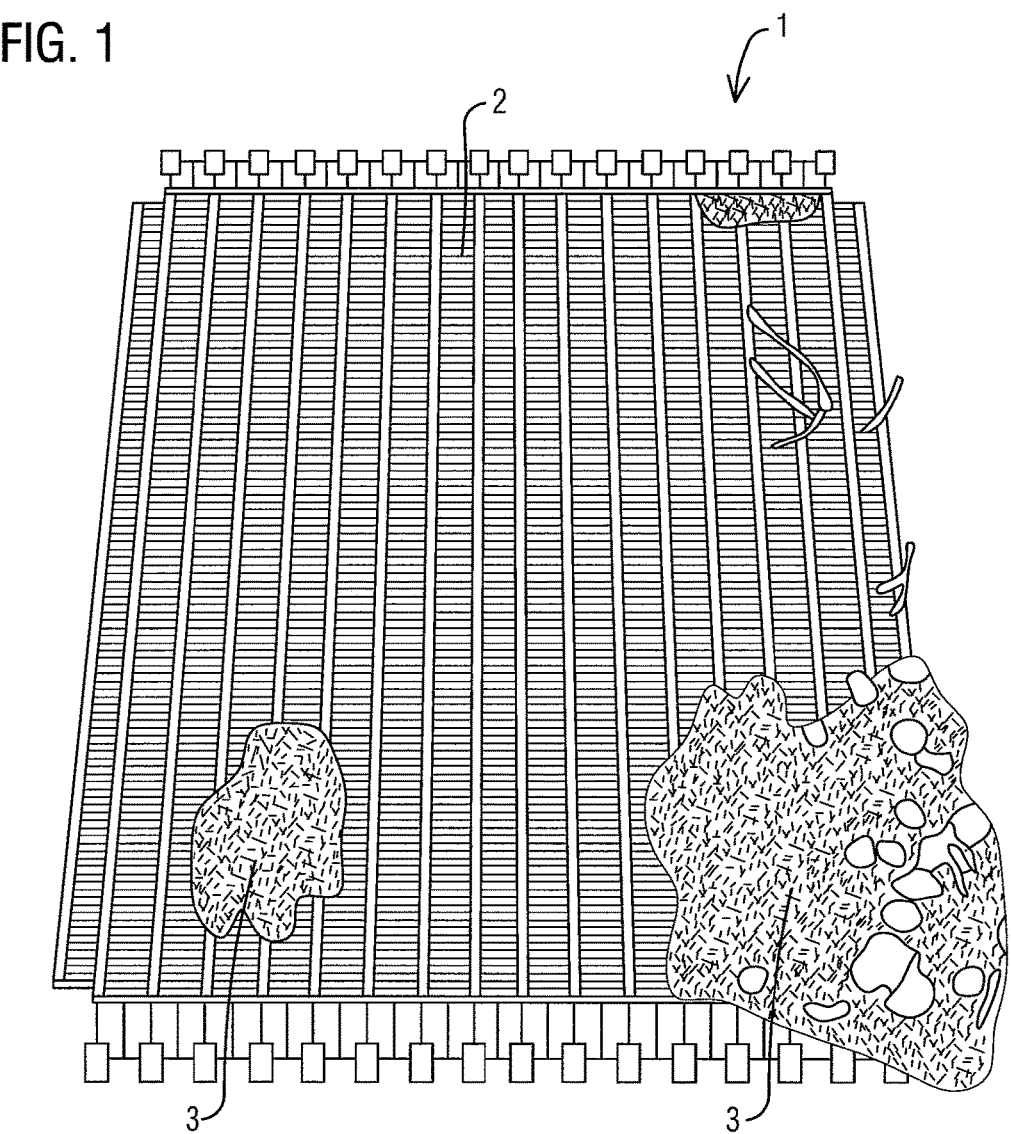
FIG. 1 is a photograph of an evaporator coil from a Ford® E Series® truck cab after having been in service in a rental truck.

As mentioned above, passenger cabins of trucks after used in the rental truck industry, such as the Ford® E Series® truck, exhibit a problem in that the air intake of the air conditioning system often ingests debris such as dust, hair, leaves, food, and other items during use of the truck by renters. This causes the evaporator coils of the air conditioning systems of such trucks to become clogged prematurely with debris, requiring costly repairs. FIG. 1 illustrates an evaporator coil removed from a Ford® E Series® rental truck cab after a nominal period of use. The evaporator coil 1 has cooling vanes 2 through which metal tubing extends. Evaporating refrigerant flows through the tubing, which chills the vanes of the coil. Air is circulated by a fan (not shown) through the evaporator coil and into the passenger cabin and thus cools the passenger cabin. In the recirculate or "max cool" mode of such an air conditioning system, cabin air is drawn into a recirculate intake behind the dash of the passenger cabin, passes though the evaporator coil, into the cabin, and is drawn again back into the recirculate intake. The air is thereby "recirculated" through the passenger cabin to effect quick or maximum cooling in hot environments. It is in this recirculate mode that debris from the cabin floorboard and floating debris from the cabin environment is drawn into the recirculate inlet and clogs the evaporator coil and other components.

Figure 2:
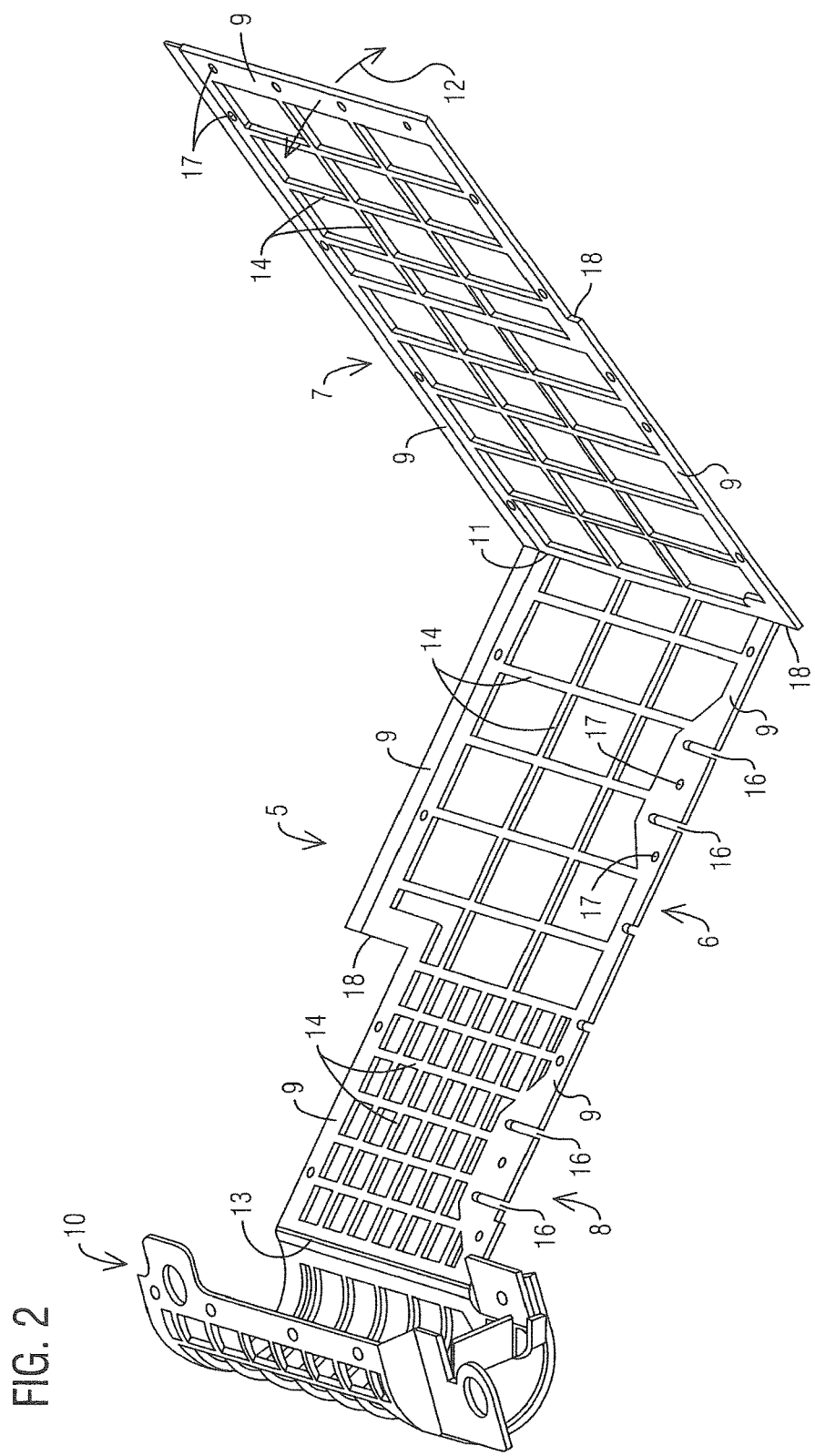
FIG. 2 is a perspective view of a debris shield according to one embodiment of the present invention.

FIG. 2 shows a debris shield according to one embodiment of the invention for blocking debris that otherwise might be drawn into the air conditioning system as described above. The debris shield 5 preferably is made of molded plastic and includes a mid-portion 6, an upper portion 7, a lower portion 8, and a bottom cage 10. The upper portion and the mid-portion are attached to one another by means of a living hinge 11 so that the upper portion 7 can articulate with respect to the mid-portion in the direction indicated by arrows 12. Similarly, the bottom cage 10 is attached to the bottom portion 8 by means of a living hinge 13 so that the bottom cage can articulate along the hinge 13 with respect to the lower portion 8.

The upper, mid, and lower portions each comprise a peripheral frame 9 that is spanned by numerous intersecting ribs 14 that together define a mesh. The mesh formed in the lower portion 8 and the cage 10 has significantly smaller opening sizes than the mesh in the mid and upper portions for reasons discussed in more detail below. Various slots 16, fastener holes 17 and offsets 18 are a part of the debris shield. These features help to conform the debris shield 5 to structures of the air conditioning ductwork and allow for its attachment to the ductwork with fasteners such as screws.

Figure 3:
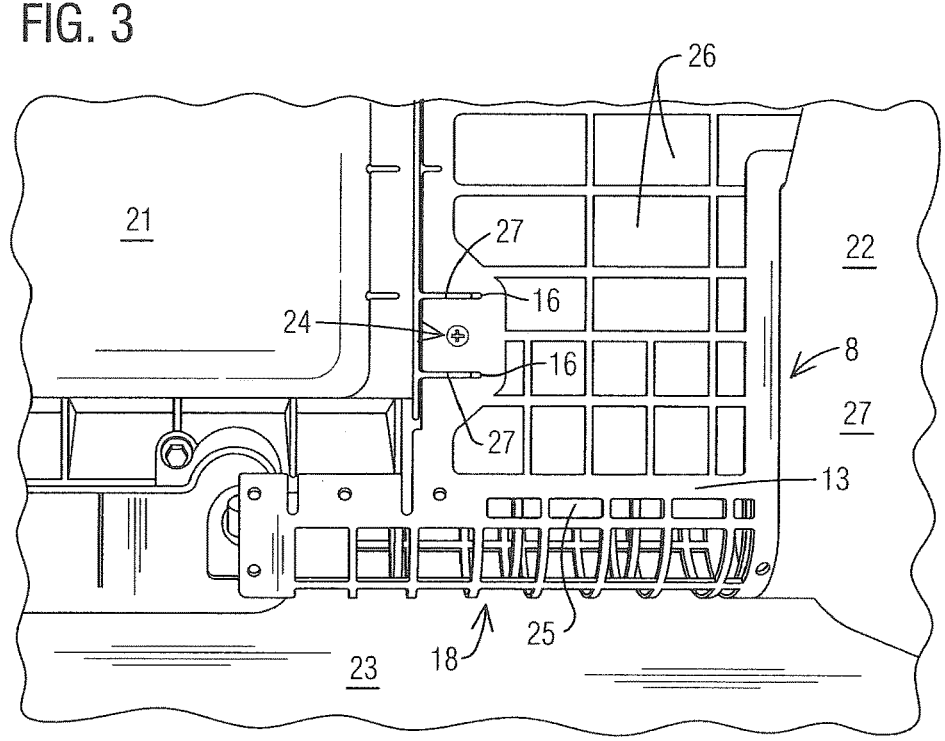
FIG. 3 shows a lower portion of the debris shield of the present invention installed over the inlet of the air conditioning system of a rental truck.

FIG. 3 shows a portion of a debris shield according to this invention installed in the cab of a Ford® E Series® truck to prevent debris from being drawn into the recirculate inlet of the air conditioning system. In this image, a kick-plate covering has been removed and the debris shield has been installed covering an air inlet opening. Air for the recirculate inlet normally is drawn in through an air inlet opening 26 in the air conditioning ductwork. The air is drawn through air inlet opening 26 of the air conditioning system, which is located near the firewall 27 of the cab. At least part of the air inlet opening 26 normally is just above the floorboard and/or transmission cowl 23 of the passenger cabin, and therein lies the problem. Debris from the floorboard is rather easily drawn into the air inlet opening resulting in a clogged evaporator coil as discussed above. In FIG. 3, the lower portion of the debris shield covers the lower portion of the opening 26 and the arcuate bottom cage 18 extends downwardly therefrom substantially to the floorboard. The cage 18 curves back upwardly so that it can rest against and/or be attached to the floorboard and/or ductwork at the bottom of the air inlet opening 26. The living hinge 13 allows the cage 18 to articulate with respect to the lower portion 8 of the debris shield to, among other things, facilitate installation and attachment to the ductwork.

It can be seen in FIG. 3 that the slots 16 formed in the frame of the debris shield align with and receive various features such as reinforcement ribs 27 that may be a part of the air conditioning system ductwork. Once in place, the debris shield can be attached to the ductwork by means of screws 24 or other appropriate fasteners. The offsets 18 formed in the frame of the debris shield allow the shield to conform to the shapes of structures such as the edge of a firewall cover as illustrated in FIG. 3. While not shown in FIG. 3, the frame and openings of the debris shield 5 also may support a finer mesh material such as a non-woven fabric mat for arresting airborne debris or pieces of floorboard debris that are smaller than the mesh openings formed by the ribs 14 of the debris shield. While it is not necessarily intended that such a finer mesh material function as a traditional cabin air filter, some filtering of airborne dust and other material may nevertheless occur when the AC system is in the recirculate mode.

Figure 4:
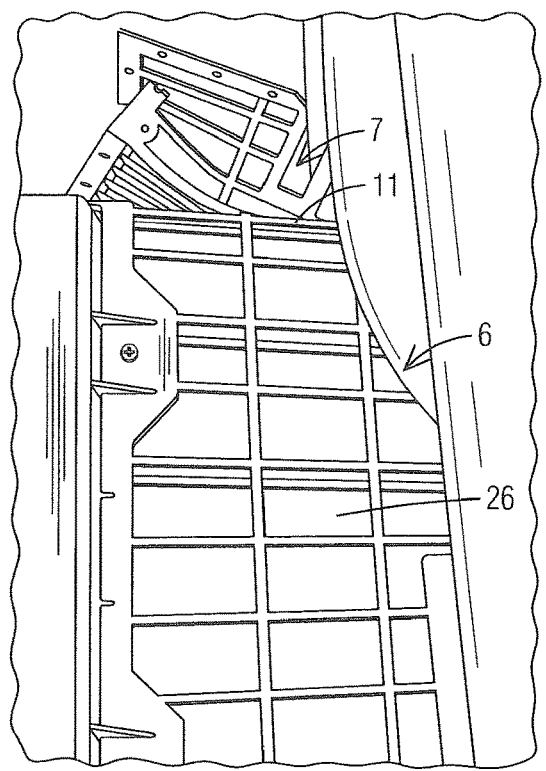
FIG. 4 shows an upper portion of the debris shield of the present invention installed over the inlet of the air conditioning system of a rental truck.

FIG. 4 illustrates the mid-portion 6 and upper portion 7 of an installed debris shield covering duct 26 of the air conditioning system ductwork. Again, the slots accommodate ribs and the frame of the debris shield is attached to the ductwork of the air conditioning system with screws. The living hinge 11 permits the upper portion 7 of the debris shield to articulate inwardly with respect to the mid-portion. In this way, the upper portion can more easily extend along and conform to the top portion of the air inlet opening 26 such that the entire opening between through which air is drawn is covered by the debris shield when installed. The debris shield thus prevents or greatly reduces ingestion of unwanted debris from bottom adjacent the floorboard of the cabin all the way to the top of the opening far above the floorboard. Further, the finer mesh material 14 (FIG. 2) attached to the debris shield provides a barrier for smaller pieces of debris such as food, paper, and the like. These types of debris are more likely to congregate on the floorboard of the vehicle near the lower portion and the cage of the debris shield.

Figure 5A:
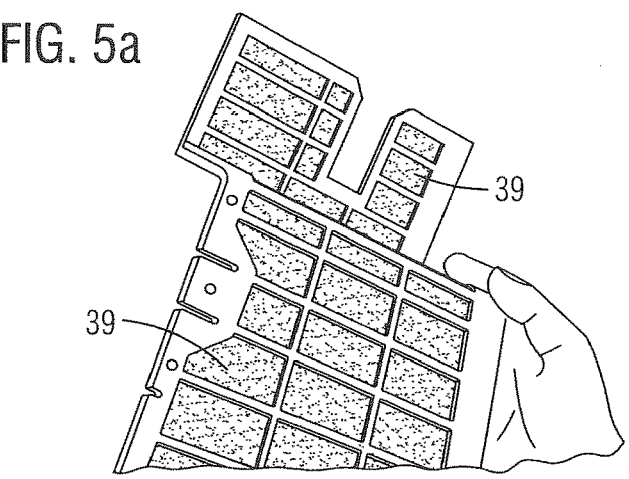
FIGS. 5*a* through 5*f* show in sequence a preferred method of installing a debris shield of the present invention onto the air conditioning system of a rental truck.
Figure 5B:
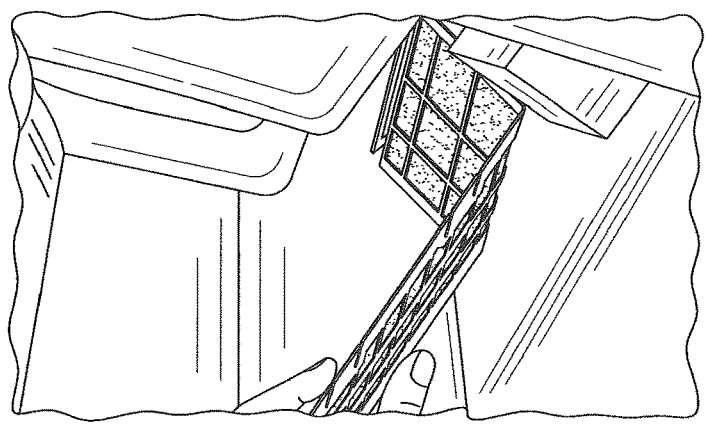
Figure 5C:
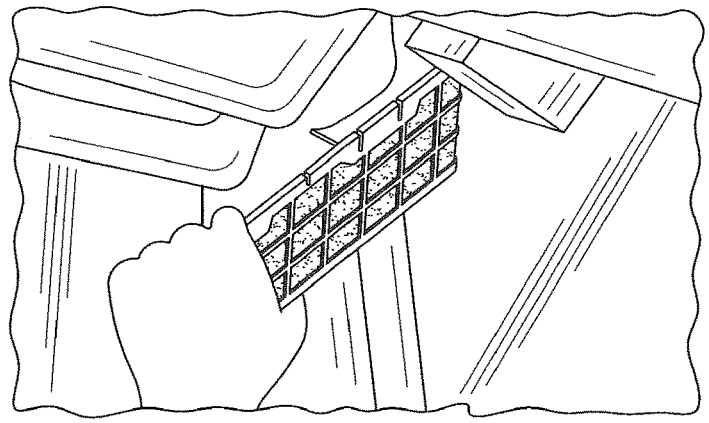

FIGS. 5a through 5f show sequentially one preferred method of installing the debris shield of this invention in the cab of a truck, in this case a Ford® E Series® truck. In these figures, a finer mesh material 39 in the form of a non-woven fabric mat is shown spanning and supported by the frame and mesh of the debris shield to provide a barrier for tiny or airborne debris particles as well as larger ones such as food. In FIG. 5a, the debris shield is prepared by pre-bending the upper portion along the living hinge 11. In the embodiment of the debris shield shown in these figures, the upper portion itself may be divided into two sections by a separate living hinge so that the upper portion can be pre-bent into an L-shape as shown in FIG. 5a. FIG. 5b shows the pre-bent debris shield being inserted top first upwardly through the opening between the ductwork and the firewall. FIG. 5c shows the debris shield being moved further upwardly.

Figure 5D:
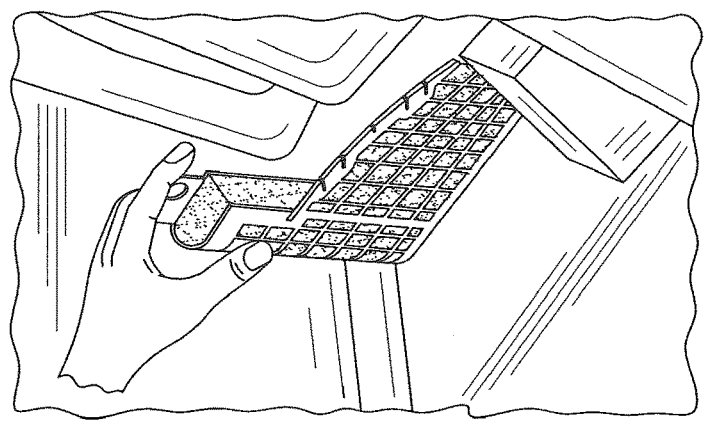
Figure 5E:
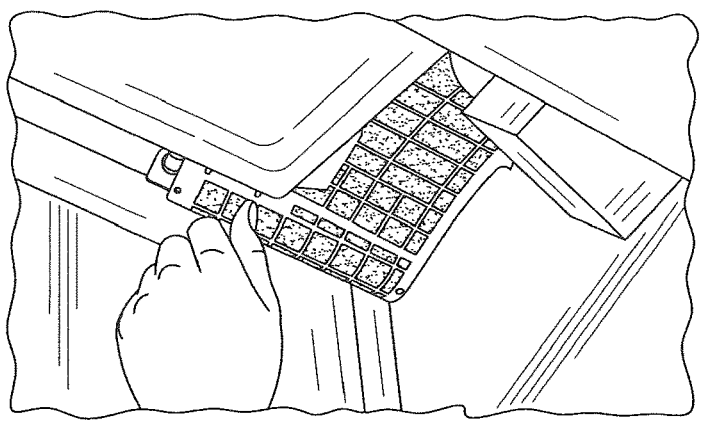
Figure 5F:
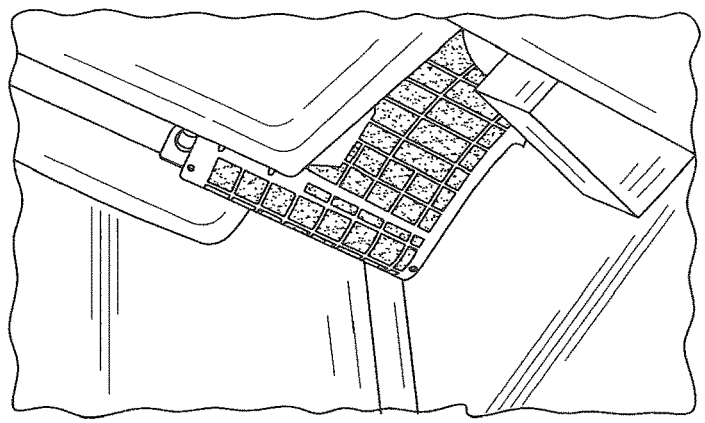

In FIG. 5d, the debris shield has been moved completely upwardly into the opening and the bottom cage of the debris shield is located near the bottom of the opening. In the process of moving the debris shield to this position the upper portion of the debris shield engages the top of the opening. Further upward movement of the debris shield from this point causes the pre-bent upper portion to begin to bunch up and thereby conform to the contours of the upper portion of the opening. This is perhaps best seen in FIG. 4 where the upper portion 7 is seen to be bent in such a way that it conforms to the contours of the ductwork surround the upper portion of the opening. In FIG. 5e, the arcuate bottom cage of the debris shield is pressed into place engaging at the bottom of the opening. After this step, the debris is in position and can be attached to the ductwork of the air conditioning system with screws as shown in FIG. 3. The final result is shown in FIG. 5f where the debris shield is seen to be in tight fitting conformance with the periphery of the opening completely covering the inlet opening through which air is drawn into the air conditioning system.

With the debris shield installed as described, and debris from the floorboard or elsewhere that might otherwise be drawn into the air conditioning system engages and is stopped by the debris shield, and particularly the arcuate bottom cage portion and the lower portion. Lighter and/or airborne debris is stopped by all portions of the debris shield. Eventually, the debris shield itself may be become somewhat clogged with debris that has been captured. At this point, and more preferably on a predetermined maintenance schedule, the debris shield is simply and easily replaced with an inexpensive new debris shield. As a consequence, the air conditioning evaporator coil and other internal components of the air conditioning system are kept cleaner and more clog-free thus prolonging their life and saving substantial money in repairs for truck rental companies.

The invention has been described herein in terms of preferred embodiments and methodologies considered by the inventor to represent the best modes of carrying out the invention. It will be understood by the skilled artisan, however, that a wide array of additions, deletions, and modifications, both subtle and gross, may be made to the exemplary embodiments presented herein without departing from the spirit and scope of the invention itself. For example, while the shape of the shield illustrated herein has been designed for use with a particular model of truck, debris shields of other shapes and configurations might well be designed for installation in other truck models. In such cases, the installation methodology also might be a bit different due to different configurations of air conditioning ductwork in such other truck models. These and other modifications are possible all within the spirit and scope of the invention as delineated only by the claims hereof.

What is claimed is:

1. A debris shield configured to conform during insertion through an access slot so that the debris shield covers an air inlet opening within the cab of a vehicle through which air is drawn into the air conditioning system of the vehicle, the debris shield comprising:
   a substantially planar mid-portion comprising a grid of crisscrossing ribs defining a plurality of openings of a first size between the ribs;
   a substantially planar upper portion hingedly connected to a first edge of the mid-portion along a first hinge line and comprising a grid of crisscrossing ribs defining a plurality of openings of a second size between the ribs;
   a substantially planar lower portion connected to a second edge of the mid-portion opposite the first edge of the mid-portion and comprising a grid of crisscrossing ribs defining a plurality of openings of a third size, the lower portion being substantially co-planar with the mid-portion; and
   a bottom cage hingedly connected to an edge of the lower portion opposite the second edge and along a second hinge line, the bottom cage being arcuate in shape and comprising a grid of crisscrossing ribs defining a plurality of openings of a fourth size.

2. A debris shield as claimed in claim 1 further comprising a web of air permeable material attached to and at least partially covering the debris shield.

3. A debris shield as claimed in claim 2 wherein the web of air permeable material comprises a non-woven material.

4. A debris shield as claimed in claim 2 wherein the web of air permeable material is attached to the mid-portion, the top portion, the bottom portion, and the bottom cage of the debris shield.

5. A debris shield as claimed in claim 1 wherein the third size is smaller than the first size.

6. A debris shield as claimed in claim 5 wherein the fourth size is smaller than the first size.

7. A debris shield as claimed in claim 6 wherein the fourth size is smaller than the second size.

8. A debris shield as claimed in claim 1 further comprising a frame surrounding at least the mid-portion, the frame having cut-outs that receive protruding features surrounding the air inlet opening.

9. A debris shield as claimed in claim 1 wherein the cage extends downwardly from the lower portion and arcs back upwardly.

10. A debris shield as claimed in claim 9 wherein the cage is substantially cylindrical in shape.

11. A debris shield as claimed in claim 10 wherein the cage arcs back upwardly a distance so that the cage substantially forms a half cylindrical cage.

12. A debris shield as claimed in claim 11 wherein the half cylindrical cage is sized to extend around the access slot adjacent a floorboard of the vehicle when the debris shield is fully inserted through the slot.

13. A method of inhibiting the ingestion of debris into an air inlet opening accessible through an access slot within the cab of a vehicle, the method comprising the steps of:
   (a) obtaining a debris shield as recited in claim 1;
   (b) bending the upper portion of the debris shield with respect to the mid portion along the first hinge line and inserting the debris shield through the access slot;
   (c) continuing to insert the debris shield through the access slot until the upper portion of the debris shield covers and conforms to the shape of an upper portion of the air inlet opening;
   (d) positioning the mid-portion of the debris shield such that the mid-portion of the debris shield covers and conforms to the shape of a mid-portion of the air inlet opening;
   (e) positioning the lower portion of the debris shield to cover a lower portion of the air inlet opening;
   (f) bending the cage of the debris shield along the second hinge line so that the cage covers the access slot;
   (g) attaching the mid-portion of the debris shield in place covering the mid-portion of the air inlet opening; and
   (h) attaching the cage of the debris shield in place covering the access slot.

14. The method of claim 13 wherein step (g) comprises inserting fasteners through the mid-portion of the debris shield and into duct work surrounding the air inlet opening.

15. The method of claim 14 wherein the step of inserting fasteners comprises inserting screws.

16. The method of claim 13 wherein step (h) comprises inserting fasteners through the lower portion of the debris shield and into duct work surrounding the air inlet opening.

17. The method of claim 16 wherein the step of inserting fasteners comprises inserting screws.

18. A debris shield for installation through an access slot within the cab of a truck until the debris shield covers an air inlet opening of the truck's air conditioning system, the air inlet opening having an upper portion, a mid-portion, and a lower portion adjacent the access slot, the debris shield comprising at least a substantially planar mid-portion, a substantially planar upper portion hingedly attached along a first edge of and extending away from the mid-portion, a substantially planar lower portion attached along a second edge of the mid-portion opposite the first edge and extending away from the mid-portion to a distal edge, and a cage hingedly attached to the lower portion along the distal edge, the mid-portion being configured to define a plurality of openings having a first size, the upper portion being configured to define a plurality of openings having a second size, the lower portion being configured to define a plurality of openings having a third size, and the cage being configured to define a plurality of openings having a fourth size, the upper portion of the debris shield being configured to conform to and cover the upper portion of the air inlet opening when the debris shield is fully inserted through the access slot, the mid-portion being shaped to conform to and cover the mid-portion of the air inlet opening when the debris shield is fully inserted through the access slot, the lower portion being shaped to conform to and cover the lower portion of the air inlet opening when the debris shield is fully inserted through the slot, and the cage being shaped to cover the access slot when the debris shield is fully inserted through the slot, and wherein the cage has a curved shape to wrap around and beneath the access slot.

19. A debris shield as claimed in claim 18 wherein the third size is less than the first size.

20. A debris shield as claimed in claim 18 further comprising an air permeable mesh sheet attached to and covering at least a portion of the mid-portion, the upper portion, the lower portion, and the cage.

21. A debris shield as claimed in claim 20 wherein the mesh sheet comprises a web of non-woven material.

22. A debris shield as claimed in claim 18 wherein the openings are formed by crisscrossing ribs.

\* \* \* \* \*